(12) United States Patent
Chino et al.

(10) Patent No.: US 6,193,009 B1
(45) Date of Patent: Feb. 27, 2001

(54) ELECTROMAGNETIC VALVE FOR A VEHICLE AND A POWER STEERING DEVICE

(75) Inventors: Kenji Chino; Kenichi Katae, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/357,256

(22) Filed: Jul. 20, 1999

(30) Foreign Application Priority Data

Jul. 24, 1998 (JP) .................................................. 10-209583

(51) Int. Cl.⁷ .................................................. B62D 5/087
(52) U.S. Cl. ........................ 180/441; 180/422; 137/599.1
(58) Field of Search .................................. 180/441, 442, 180/417, 421, 422; 137/601.14, 599.11, 599.1, 878

(56) References Cited

U.S. PATENT DOCUMENTS

| | | | |
|---|---|---|---|
| 4,816,083 | * 3/1989 | Bangyan | 137/271 |
| 5,267,628 | 12/1993 | Tomiyoshi et al. | 180/139 |
| 5,312,167 | * 5/1994 | Giorgetti et al. | 303/3 |
| 5,469,886 | * 11/1995 | Noya | 137/599 |

FOREIGN PATENT DOCUMENTS

| | | |
|---|---|---|
| 2 173 458 | 10/1986 | (GB) . |
| 2 251 225 | 7/1992 | (GB) . |
| 61-200060 | 9/1986 | (JP) . |
| 62-261164 | 11/1986 | (JP) . |
| 62-174273 | 11/1987 | (JP) . |
| 5-262246 | 10/1993 | (JP) . |
| 8-156813 | 6/1996 | (JP) . |
| 9-39816 | 2/1997 | (JP) . |
| 9-263258 | * 10/1997 | (JP) . |

* cited by examiner

*Primary Examiner*—Paul N. Dickson
*Assistant Examiner*—Avraham H. Lerner
(74) *Attorney, Agent, or Firm*—Morgan & Finnegan, L.L.P.

(57) ABSTRACT

An electromagnetic valve for a vehicle that returns at least some of the hydraulic oil sent to a hydraulic actuator is provided. The valve has a body, two passages located at intermediate portions of two pipes, respectively, an oil path passing through the body for connecting the two passages to return the hydraulic oil from the one pipe to the other, and a valve mechanism provided within the body, the valve mechanism including a portion of the oil path and a valve body for opening and closing the oil path. Each of the two passages includes a bypass passage that does not pass through the valve mechanism. Therefore, the pressure loss of the hydraulic oil passing through the valve when the valve is closed is not significant.

19 Claims, 5 Drawing Sheets

ELECTROMAGNETIC VALVE FOR A VEHICLE AND A POWER STEERING DEVICE

BACKGROUND OF THE INVENTION

The present invention relates to an electromagnetic valve used for correcting the difference between the angle of a steering wheel and that of a steered wheel in the hydraulic circuit of a vehicle hydraulic power steering device and to a hydraulic power steering device using such a valve.

Recently, many types of industrial vehicles, including forklifts, have been equipped with power steering devices, some of which include hydraulic power steering devices. However, the hydraulic power steering devices have drawbacks. In a steering valve, which forms part of the hydraulic power steering device and is driven by the manipulation of a steering wheel, the relationship (discharge efficiency= actual discharge amount/theoretical discharge amount) between the movement of the steering wheel and the amount of oil discharged from the steering valve changes slightly depending on the angular velocity of the steering wheel. Also, oil can not be prevented from leaking slightly from the oil hydraulic circuit. For this reason, a difference in position between the steering wheel and the steered wheel occurs.

In order to solve this problem, Japanese Patent Publication No. 3-30544, Japanese Patent Publication No. 4-24270 and Japanese Utility Model Publication No. 7-5364 disclose devices for correcting the difference in position between the steering wheel and the steered wheel. FIG. 5 shows such a device for correcting the angle of a steering wheel.

An entire-hydraulic power steering device 71 includes a steering valve 73 driven by manipulation of a steering wheel 72 and a steering cylinder 75 for steering the tires, or steered wheels 74. The steering valve 73 and the steering cylinder 75 are connected by two hydraulic pipes 76, 77. An electromagnetic valve (a correcting valve) 78 is located in the pipes 76, 77 at an intermediate location of the pipes 76, 77. When the steering wheel 72 is manipulated, the steering valve 73 discharges hydraulic oil flowing in from a hydraulic pump 79 to the pipes 76, 77 corresponding to the manipulation direction of the steering wheel and exhausts return oil (returning from the steering cylinder 75) from the other of the pipes 76, 77 to an oil tank 80.

A controller 81 is connected to a first sensor 82 for detecting the angular position of the steering wheel and a second sensor 83 for detecting the steered angle of one of the steered wheels 74. The controller 81 calculates a target angle of the steered wheel 74 based on a value detected by the first sensor and compares the actual angle of the steered wheel 74 detected by the second sensor with the target angle to determine the difference between the target angle and the actual angle. When the difference exceeds a tolerance limit, the controller 81 causes the electromagnetic valve 78 to open. When the steering wheel 72 is manipulated while the valve 78 is open, some of the hydraulic oil is returned to the oil tank 80 through the valve 78, which decreases the amount of hydraulic oil sent to the steering cylinder 75. Accordingly, the steering wheel 72 races. When the angle of the steering wheel coincides with the angle of the wheel 74, the valve 78 is closed. This procedure corrects the relationship between the wheel 74 and the steering wheel 72.

The electromagnetic valve 78 in the prior art has a structure shown in FIG. 6. The valve 78 includes a driving control unit 85 and a manifold 86. The driving control unit 85 includes a solenoid 87 and a plunger (valve body) 88. The plunger 88 is urged downwardly and away from a plug 90 by a spring 89 and is driven upwardly in a direction approaching the plug 90 by the solenoid 87, thus the plunger 88 is displaced axially. The plunger 88 has a ball 92 fitted on the tip portion thereof. A spool 91 is located below the plunger 88. Oil paths 91a, 91b are formed in the spool 91 to return the hydraulic oil. Also, an oil path 91c is formed by a recess in the outer peripheral surface of the spool 91. When the hydraulic oil is not returned, the hydraulic oil passes through the oil path 91c. By vertically displacing the plunger 88, the ball 92 is separated from and abutted against the upper end surface of the spool 91, which opens and closes the return oil paths 91a, 91b. Four straight-type fittings 93a, 93b, 94a, 94b are attached to the manifold 86. The left fittings 93a and 93b are respectively connected to the two pipes extending from the steering valve 73 and the right fittings 94a and 94b are respectively connected to the two pipes extending from the steering cylinder 75. A passage 95 connects the fittings 93a and 94a at the upper side of the manifold 86, and a passage 96 connects the fittings 93b and 94b at the lower side of the manifold 86. The terms "upper" and "lower" refer to the orientation of FIG. 6.

When the valve 78 is closed (in the state shown in FIG. 6), the feed oil and the return oil pass through the passages 95 and 96. In FIG. 6, the passage 95 at the upper side of the manifold 86 includes the oil path 91c. Since the oil path 91c is formed in the outer peripheral surface of the spool 91, it is difficult to make the oil path 91c with a large inside diameter. Therefore, the oil path 91c has a relatively small inside diameter.

Thus, even if the valve 78 is closed, either the feed oil or the return oil must pass through the narrow oil path 91c around the spool 91. Since the oil path 91c is not only narrow, but it bends, the hydraulic oil passing through this path is subject to a pressure loss. Accordingly, since the pressure of the hydraulic oil sent to the steering cylinder 75 is relatively weak, this adversely affects the response to manipulation of the steering wheel 72. The consequences are, for example, that the response of the steered wheel 74 to the manipulation of the steering wheel 72 is delayed, and the steered wheel 74 cannot be turned if the steering wheel 72 is only slightly manipulated. Therefore, drivers feel that the steered wheel 74 has a poor response to the manipulation of the steering wheel 72.

Also, when hydraulic oil passes through the narrow oil path 91c, friction heat is likely to occur, which will raise the temperature of the oil. Warmer oil causes heat damage to packing materials and leads to oil leakage. Further, warmer oil imposes a heat burden on parts of the electric system, such as the solenoid 87, which shortens the life of the electric system.

SUMMARY OF THE INVENTION

In order to solve these problems, it is a first object of the present invention to provide an electromagnetic valve for a vehicle that returns at least some of the hydraulic oil sent to a hydraulic actuator such that the pressure loss of the hydraulic oil passing through the valve when the valve is closed is not significant.

Further, it is a second object of the present invention to provide a hydraulic power steering device equipped with a function for correcting the difference in position between the steering wheel and the steered wheel, such that the steered wheel is very responsive to the manipulation of the steering wheel when the correction of the difference in position is not being performed.

In order to achieve these object, in accordance with a first aspect of the present invention, there is provided an electromagnetic valve used in a vehicle having an oil supplying device for supplying hydraulic oil, a hydraulic actuator driven by the hydraulic oil supplied from the oil supplying device, and two pipes connecting the oil supplying device and the hydraulic actuator. The two pipes are such that, when one of the pipes supplies hydraulic oil from the oil supplying device to the hydraulic actuator, the other returns hydraulic oil from the hydraulic actuator to the oil supplying device and vice versa. The electromagnetic valve comprises: a body; two passages located at intermediate portions of the two pipes, respectively; an oil path passing through the body for connecting the two passages to return the hydraulic oil from the one pipe to the other; and a valve mechanism provided within the body. The valve mechanism includes a portion of the oil path and a valve body for opening and closing the oil path. Each of the two passages includes a bypass passage that does not pass through the valve mechanism.

In accordance with a second aspect of the present invention, there is provided a power steering device used in a vehicle having a steering wheel and steered wheels. A steering valve supplies hydraulic oil by the manipulation of the steering wheel. A steering actuator steers the steered wheels by the hydraulic oil supplied from the steering valve. Two pipes connects the steering valve and the steering actuator. The two pipes are such that, when one of the pipes supplies hydraulic oil from the steering valve to the steering actuator, the other returns the hydraulic oil from the steering actuator to the steering valve, and vice versa. An electromagnetic valve is located in the two pipes, for returning hydraulic oil from the one pipe to the other pipe to correct the positional relationship between the steering wheel and the steered wheels. The electromagnetic valve comprises: a body; two passages located at intermediate portions of the two pipes, respectively; an oil path passing through the body for connecting the two passages to return the hydraulic oil; and a valve mechanism provided within the body. The valve mechanism includes at least portion of the oil path and a valve body for opening and closing the oil path. Each of the two passages includes a bypass passage that does not pass through the valve mechanism.

In accordance with a third aspect of the present invention, there is provided an electromagnetic valve comprising: a body; two passages through which hydraulic oil passes, wherein, when the hydraulic oil is sent through one of the two passages, hydraulic oil is returned through the other and vice versa; an oil path passing through the body for connecting the two passages to return the hydraulic oil from the one passage to the other; a valve mechanism provided within the body, the valve mechanism including a portion of the oil path and a valve body for opening and closing the oil path, and a driving control unit housed within the body for driving the valve body to open and close the oil path. Each of the two passages includes a bypass passage that does not pass through the valve mechanism. The bypass passage has an inside diameter larger than that of the portion of the oil path included in the valve mechanism. The bypass passage is formed of a three way fitting or a four way, or more, fitting mounted to the body. The minimum diameter of the oil path is so small that it functions as a throttle valve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
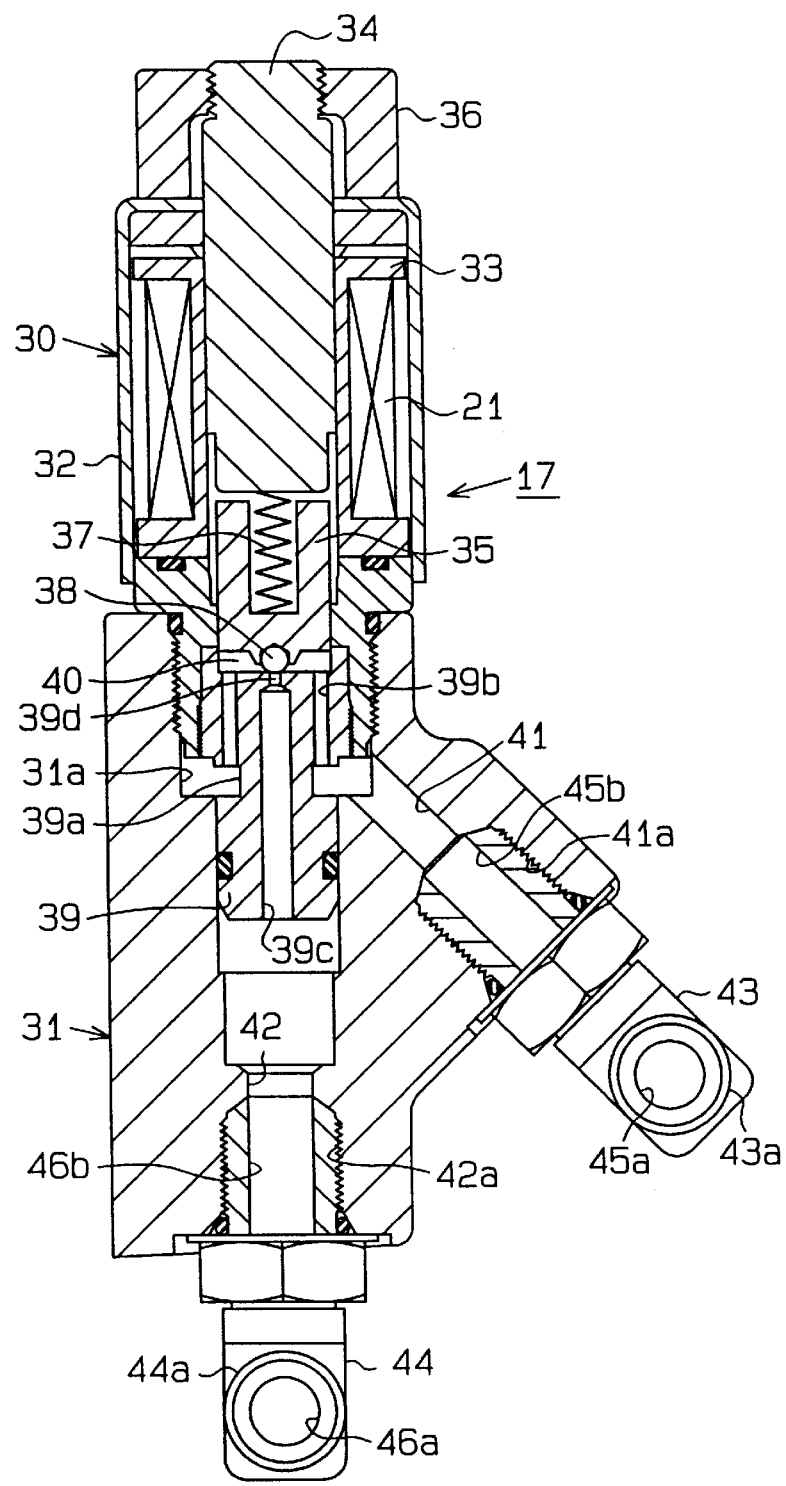
FIG. 1 is a side cross-sectional view showing an electromagnetic valve in accordance with one embodiment of the present invention.

One embodiment of the present invention will now be described with reference to FIGS. 1 to 4.

Forklift trucks, referred to as a forklift, are one type of industrial vehicle that benefits from the invention. The forklift 1 is a four-wheeled vehicle having front wheel drive and rear wheel steering. Front wheels 2 are driven by the output of an engine 4 contained below a hood 3. Rear wheels, or steered wheels 5, are steered by a hydraulic (entire-hydraulic) power steering device 7 (shown in FIG. 3), which is described later, when a steering wheel 6 is manipulated.

Figure 3:
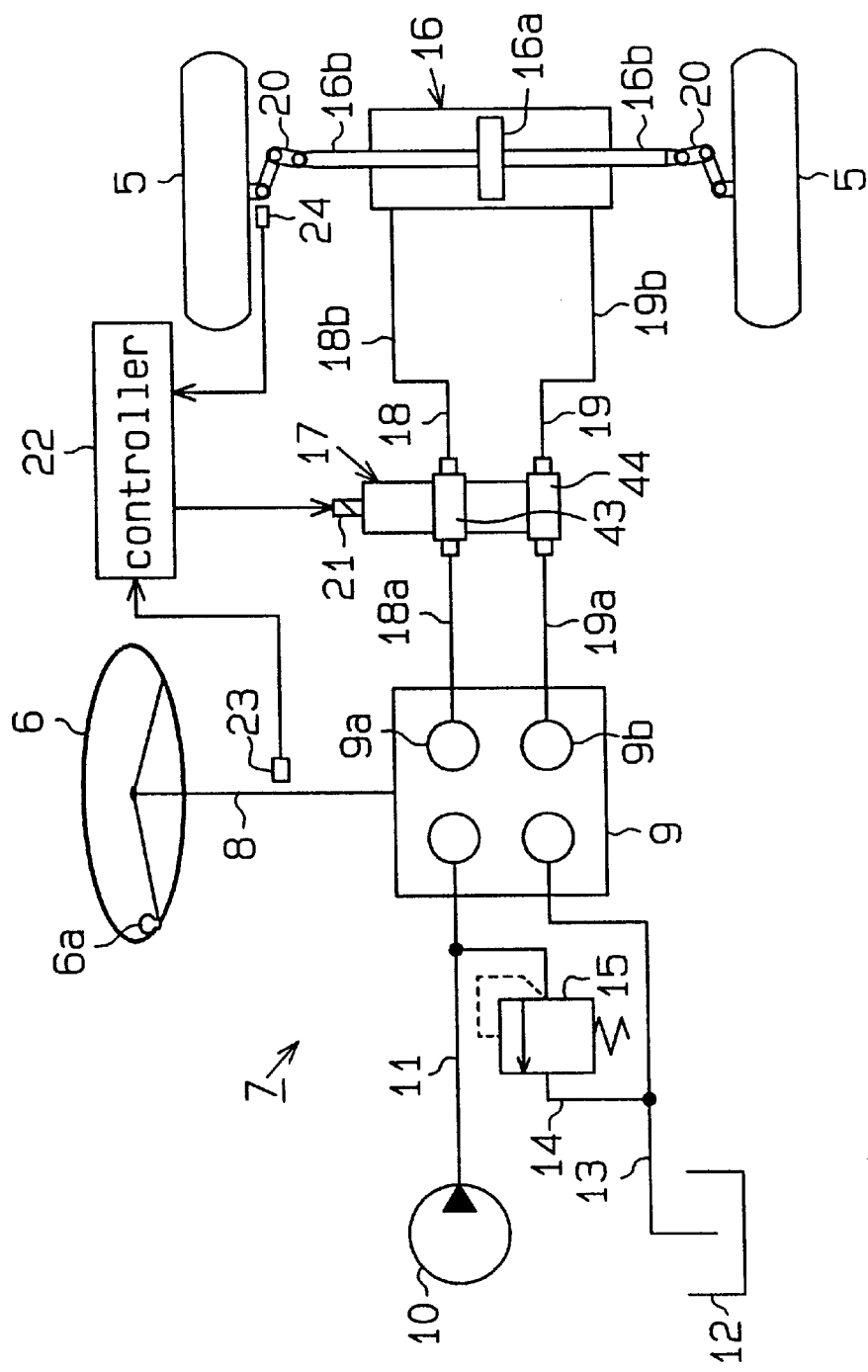
FIG. 3 is a schematic structural view of a hydraulic power steering device.
Figure 4:
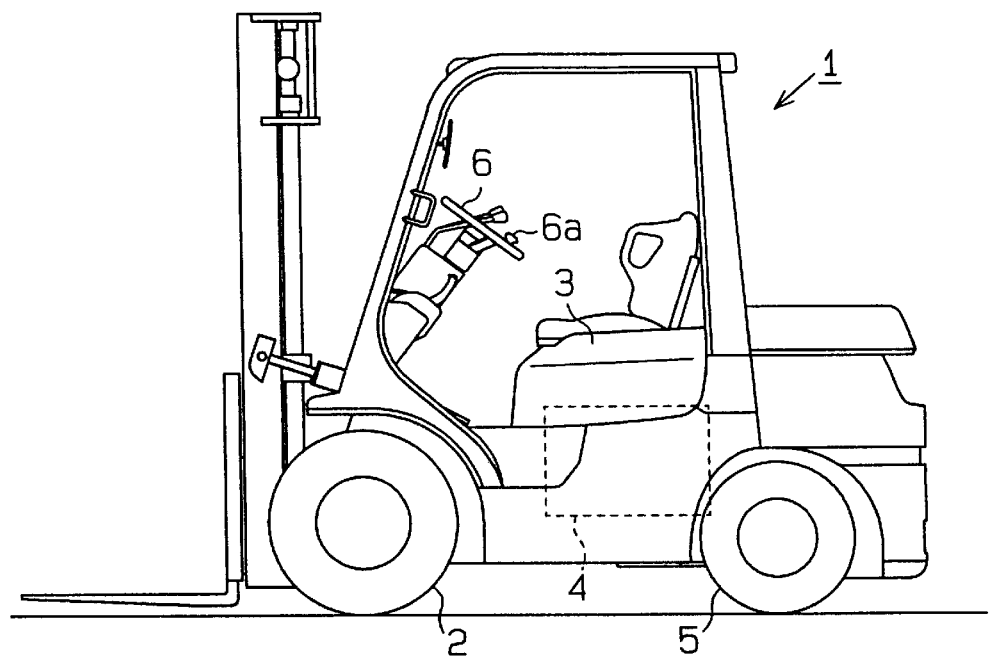
FIG. 4 is a side view of a forklift.
Figure 5:
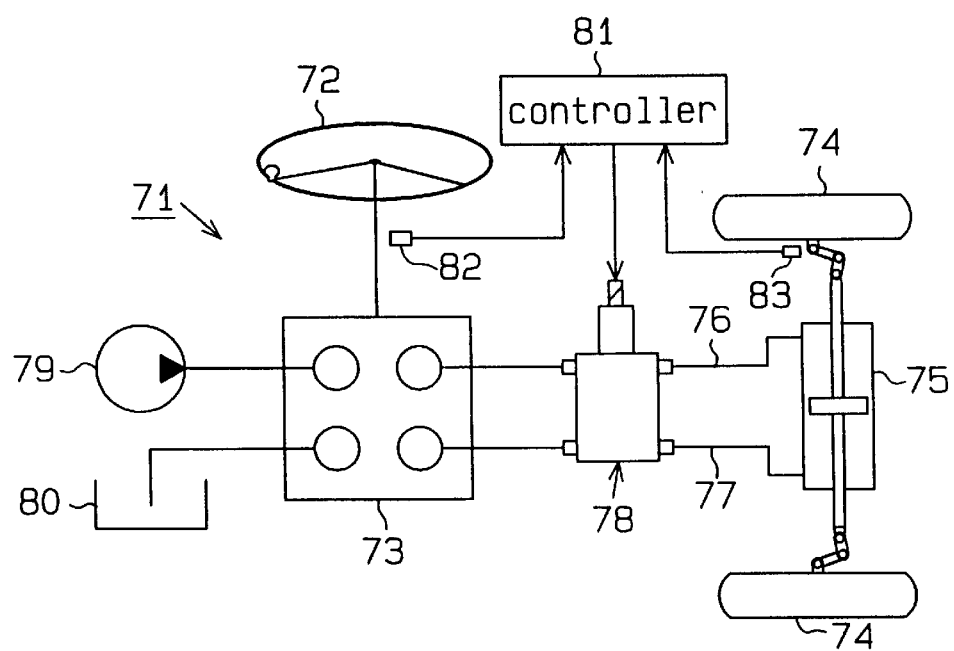
FIG. 5 is a schematic structural view of a hydraulic power steering device in the prior art.

FIG. 3 shows the hydraulic power steering device 7 having a function of correcting the position of a knob 6a of the steering wheel 6. The steering wheel 6 is supported by a steering shaft 8, which is coupled to a steering valve 9. The steering valve 9 serves as an oil supplying device.

The steering valve 9 is connected, through a supply pipe 11, to a hydraulic pump 10 (a loading pump), which is driven by the engine 4, and is connected, through an exhaust pipe 13, to an oil tank 12. A relief valve 15 is provided on a pipe line 14 connecting the supply pipe 11 and the exhaust pipe 13. The oil pressure of the hydraulic oil flowing in the steering valve 9 from the hydraulic pump 10 is maintained at a constant value (a set value) by the relief valve 15. If the forklift 1 is driven by a battery, the hydraulic pump 10 is driven by an electric motor.

The steering valve 9 is directly driven by the steering shaft 8 and has two ports 9a and 9b. The steering valve 9 functions to send hydraulic oil from one of the two ports 9a, 9b that corresponds to the direction of the manipulation of the steering wheel 6. The amount of the hydraulic oil sent from one of the ports 9a, 9b is approximately proportional to the amount of manipulation of the steering wheel 6. When the steering wheel 6 is not manipulated, the hydraulic oil flowing in the steering valve 9 is exhausted through the exhaust pipe 13 to the oil tank 12. When the steering wheel 6 is manipulated, return oil returns to the other of the ports 9a and 9b and is then exhausted through the exhaust pipe 13 to the oil tank 12.

A steering cylinder 16 is connected through two hydraulic pipes 18, 19 to the steering valve 9. The interior of the steering cylinder 16 is partitioned into two chambers by a piston 16a. The two pipes 18, 19 are connected to the two chambers, respectively. The steering cylinder 16 has two rods 16b, which are connected through link mechanisms 20 (including knuckle arms) to the steered wheels 5. The steering cylinder 16 may be referred to as a hydraulic actuator, or a steering actuator.

When the steering wheel 6 is manipulated, one of the two pipes 18, 19, which corresponds to the direction of the manipulation of the steering wheel 6, functions as a feeding line for conducting the feed oil and the other of the pipes 18, 19 functions as a return line for conducting the return oil returning from the steering cylinder 16. Thus, when the steering wheel 6 is manipulated, the rods 16b, 16b of the steering cylinder 16 are driven in the direction that corresponds to the direction of the manipulation of the steering wheel 6 and by an amount of movement corresponding to the amount of the manipulation of the steering wheel 6. Consequently, the steered wheels 5 are steered. The steering cylinder 16 is contained within a rear axle beam (not shown), which is supported pivotally, in the rolling direction, at the rear portion of the forklift 1.

An electromagnetic valve 17 is located in the intermediate portions of the two pipes 18, 19. The valve 17 functions as a correcting valve for correcting the position of the knob 6a. That is, two pipes 18a, 19a, which extend from the steering valve 9, and two pipes 18b, 19b, which extend from the steering cylinder 16, are connected respectively to four ports of the valve 17 as shown in FIG. 3. An internal oil path, or return path, extends through the valve 17 to connect the two pipes 18, 19. The valve 17 opens and closes the internal oil path. When the valve 17 is closed, the internal oil path is closed and all the hydraulic oil discharged from the steering valve 9 is supplied directly to the steering cylinder 16. When the valve 17 is opened, the internal oil path is opened, and some of the hydraulic oil that would otherwise be sent to the steering cylinder 16 returns to the oil tank 12 through the oil path, thus causing the steering wheel 6 to race. When the steering wheel 6 races, the target angle of the tire (steered wheels 5), which corresponds to the angle of the steering wheel 6, can coincide with the actual angle of the tire to reduce the difference between the target angle and the actual angle of the tire, for correcting the positional relationship between the steering wheel 6 and the steered wheels 5.

A controller 22 selectively excites and deexcites a solenoid 21 of the valve 17. A first sensor 23 and a second sensor 24 are electrically connected to the controller 22. The first sensor 23 detects the angular position (steering wheel angle) of the steering wheel 6, and the second sensor 24 detects the steered angle (tire angle) of the steered wheel 5. The controller determines a target angle of the steered wheel (target tire angle) based on the value detected by the first sensor 23. Further, the controller 22 determines the difference between the target tire angle and the actual tire angle detected by the second sensor 24 and continually determines whether or not the difference exceeds a tolerance limit. When the difference exceeds the tolerance limit, the controller 22 excites the solenoid 21 to open the valve 17. The controller 22, the first sensor 23 and the second sensor 24 are referred to collectively as a control device.

Figure 2:
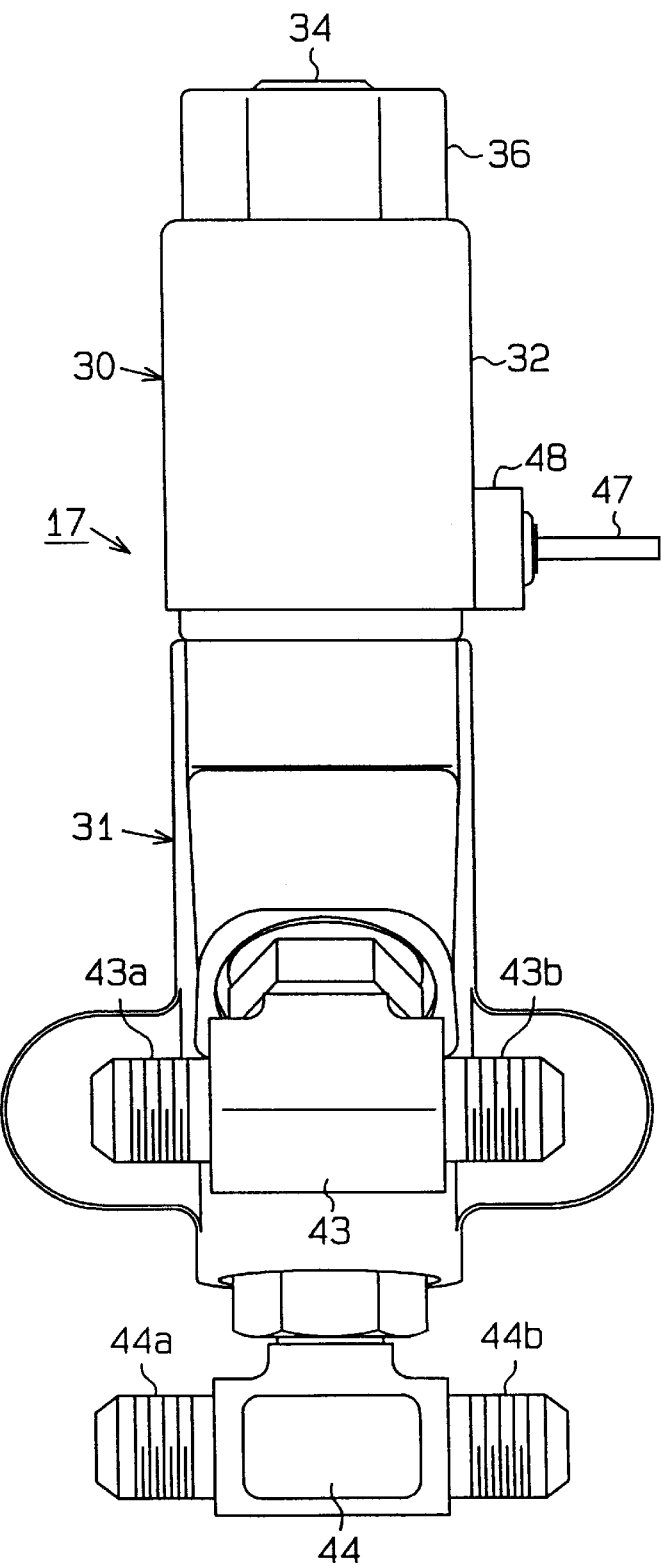
FIG. 2 is a front view of FIG. 1.

FIGS. 1 and 2 show the structure of the electromagnetic valve 17. As shown in FIGS. 1 and 2, the valve 17 has a driving control unit 30 and a manifold 31. The driving control unit 30 has basically the same structure as that of the prior art valve 78 shown in FIG. 6. Namely, as shown in FIG. 1, the driving control unit 30 has a housing 32, which contains the solenoid 21, a cylindrical yoke 33, a plug 34, and a plunger 35. The plunger 35 serves as a valve body. The solenoid 21 surrounds the cylindrical yoke 33. The plug 34 is fitted into the cylindrical yoke 33. The upper end portion of the plug 34 protrudes through the top portion of the housing 32. A regulation member 36 is threaded to the upper end of the plug 34 and positions the plug 34 relative to the housing 32. The plunger 35 is urged downwardly and away from the plug 34 by a spring 37 and is axially displaced by excitation and deexcitation of the solenoid 21. A ball 38 is fixed to the tip portion of the plunger 35.

Underneath the plunger 35, a spool 39 is threaded to the bottom portion of the driving control unit 30. The spool is formed with an annular oil path 39a and includes peripheral oil paths 39b and an axial passage 39c. The annular oil path 39a is formed by an annular groove in the outer peripheral surface of the spool 39. An oil chamber 40 is formed by a gap between the spool 39 and the plunger 35. The peripheral oil paths 39b are formed to extend through the spool 39 in the axial direction to connect the oil chamber 40 and the oil path 39a. The axial oil path 39c is formed to extend axially through the spool 39 and has an opening at a position opposite to the ball 38. The plunger 35 and the spool 39 are referred to collectively as a valve mechanism. The annular passage 39a, the peripheral passages 39b, the axial passage 39c and the oil chamber 40 in the valve mechanism constitute at least part of the internal oil path for returning the hydraulic oil. The internal oil path, which is formed within the spool 39, has a relatively small cross-sectional area. Further, the oil path has a minimum inside diameter section 39d small enough to serve as a throttle valve. Thus, even if the valve 17 fails and remains open, the oil path for returning oil is throttled, which allows the steered wheels 5 to be steered by the manipulation of the steering wheel 6.

When the plunger 35 is axially displaced, the axial oil path 39c is opened and closed by the ball 38 fixed to the tip of the plunger 35. The bottom portion of the driving control unit 30 is threaded into an assembly hole 31a formed in the manifold 31 so that the driving control unit 30 is integral with the manifold 31. The manifold 31 and the housing 32 form a body of the valve 17 within which the valve mechanism is located.

Within the manifold 31, first and second main return passages 41 and 42 are formed to communicate with the assembly hole 31a. The first main passage 41 communicates with the annular oil path 39a, and the second main passage 42 communicates with the axial oil path 39c formed through the spool 39. The main passages 41 and 42 are open toward the outside of the manifold 31 where they have first and second threaded holes 41a and 42a, respectively. First and second T-shaped fittings (three way type fittings) 43 and 44 are threaded into the first and second threaded holes 41a and 42a, respectively.

The first fitting 43 has two joints 43a and 43b, which are provided at opposite ends of an exposed portion of the first fitting 43. Similarly, the second fitting 44 has two joints 44a and 44b, which are provided at the distal ends of an exposed portion of the second fitting 44. In the arrangement of FIG. 3, the two pipes 18a and 19a extending from the steering valve 9 are connected, respectively, to the joints 43a and 44a of the fittings 43 and 44, which appear in the left side of FIG. 2. The two pipes 18b and 19b extending from the steering cylinder 16 are connected, respectively, to the joints 43b and 44b of the first and second fittings 43 and 44, which appear in the right side of FIG. 2.

The first fitting 43 has a transverse passage 45a and an axial passage 45b formed therein. The transverse passage 45a provides a straight connection between the openings in the ends of the joints 43a and 43b, which are provided at the ends of the first fitting 43. The axial passage 45b branches from the transverse passage 45a so as to form a T-junction and communicate with the first passage 41.

Similarly, the second fitting 44 has a transverse passage 46a and an axial passage 46b. The transverse passage 46a provides a straight connection between the openings in the ends of the joints 44a and 44b, which are provided at the ends of the second fitting 44. The axial passage 46b branches from the transverse passage 46a to form a T-junction and communicate with the second passage 42.

The transverse passages 45a and 46a, which extend along the axes of the exposed portions of the first and second fittings 43 and 44, are referred to as bypass passages and do not pass through the spool 39. The axial passage 45b, the first main passage 41, the annular passage 39a, the peripheral passages 39b, the oil chamber 40, the axial oil path 39c, the second main passage 42, and the axial passage 46b form the return oil path. The inside diameters of the bypass passages are larger than that of the part (39a, 39b, 39c and 40) of the return oil path located inside the valve mechanism.

As shown in FIG. 2, a connector 48 is joined to the side wall of the housing 32. The connector 48 connects a wire 47 to the solenoid 21 for supplying electricity to the solenoid 21.

Next, the operation of the hydraulic power steering device 7 and the function of correcting the position of the knob will be explained.

When the forklift 1 is operated, the hydraulic oil from the hydraulic pump 10, which is regulated to a set pressure by the relief valve 15, flows into the steering valve 9. When the steering valve 9 is directly driven by the manipulation of the steering wheel 6, the steering valve 9 delivers hydraulic oil from one of the two ports 9a and 9b that corresponds to the direction of the manipulation of the steering wheel 6. The amount of the hydraulic oil sent from one of ports 9a and 9b is approximately proportional to the amount of the manipulation of the steering wheel 6.

While the forklift 1 is operated, the controller 22 successively executes a program for correcting the position of the knob. The controller 22 determines the target tire angle based on a value detected by the first sensor 23, determines the difference between the target tire angle and the actual tire angle detected by the second sensor 24, and determines whether or not the difference exceeds the tolerance limit. When the difference does not exceed the tolerance limit, the controller 22 maintains the electromagnetic valve 17 in a closed state.

The hydraulic oil is sent from the steering valve 9 to one of the two pipes 18, 19 by the manipulation of the steering wheel 6. When the valve 17 is in the closed state and correction of the knob's position is not performed, the supplied oil (the feed oil) flows in one of the chambers of the steering cylinder 16. Return oil is discharged from the other of the chambers to the other of the pipes 18, 19 and is returned to the steering valve 9.

When the valve 17 is in the closed state, i.e., when the solenoid 21 is deexcited, the plunger 35 descends under the urging force of the spring 37 as shown in FIG. 1, and the axial oil path 39c is closed by the ball 38 mounted to the tip of the plunger 35. Accordingly, the feed oil and the return oil are conducted straight through the transverse passages 45a, 46a (bypass passages) of the two T-shaped fittings in the axial direction thereof (left and right directions in FIG. 2) and do not pass through the internal oil path within the valve 17. Thus, as the hydraulic oil passes straight through the passages 45a, 46a, there is no a significant pressure loss, which would occur if the passages had bends or other restrictions.

The inside diameters of the transverse passages 45a, 46a of the first and second fittings 43, 44 are as large as those of the pipes 18, 19 and, therefore, there is scarcely any pressure loss in the hydraulic oil passing through these passages 45a, 46a. Accordingly, the steered wheels 5 are very responsive to the manipulation of the steering wheel 6, which is recognized by the driver.

The discharge efficiency of the steering valve 9 falls when the steering wheel 6 is manipulated at a slow speed. Also, oil can not be prevented from leaking slightly from the hydraulic circuit. Because of the lowering of the discharge efficiency and the oil leakage, the position of the knob 6a of the steering wheel 6 is frequently shifted. In this case, the controller 22 determines that the difference between the target tire angle and the actual tire angle exceeds the tolerance limit and excites the solenoid 21.

When an electric current flows into the solenoid 21 and the plunger 35 moves upwardly against the urging force of the spring 37, the ball 38 is separated from the upper end surface of the spool 39 to open the oil path 39c. Then, the feed oil flowing, for example, in the transverse passage 45a from the joint 43a of the first fitting 43 passes through the axial passage 45b and the first passage 41 to reach the periphery of the spool 39. The oil then passes through the internal path 39a, 39b, 39c, 40 for returning the hydraulic oil, through the second main passage 42, the axial passage 46b, and out of the joint 44a of the second fitting 44. By thus returning the hydraulic oil, the steering wheel 6 is permitted to race to correct the position of the knob 6a.

For example, when the steered wheels 5 are mired in a ditch and can not be steered, the pressure of the hydraulic oil passing through the first and second fittings 43, 44 becomes very high. Under such high pressure, the plunger 35 is pushed up against the urging force of the spring 37, and some of the hydraulic oil is returned through the internal oil path 39a, 39b, 39c. Thus, the parts constituting the hydraulic circuit are protected from the high pressure. In this case, the ball 38 of the plunger 35 and the spring 37 function as a check valve. Except for a state where the oil pressure becomes abnormally high, the hydraulic oil passes through the internal oil path 39a, 39b, 39c, 40 formed in the spool 39 only when the position of the knob 6a is corrected.

According to the present embodiment as stated above, the following effects are obtained.

(1) When the position of the knob is not corrected, as the hydraulic oil passes through the transverse passages 45a, 46a of the T-shaped first and second fittings 43, 44, which have relatively wide cross-sectional areas, there is almost no pressure loss in the hydraulic oil. Accordingly, when the steering wheel 6 is manipulated, the high pressure hydraulic oil is sent to the steering cylinder 16. Therefore, the steered wheels 5 are very responsive to the manipulation of the steering wheel 6, and a driver will feel the improved response when he manipulates the steering wheel 6.

(2) When the position of the knob 6a is not being corrected, since the hydraulic oil does not pass through the relatively narrow internal oil path 39a, 39b, 39c, 39d, the temperature of the hydraulic oil is not abnormally elevated. Accordingly, the heat damage to packing materials due to abnormally high oil temperatures, and resulting oil leakage can be substantially prevented. Also, the heat burden on electric parts such as the solenoid 21 due to abnormally high oil temperatures is reduced.

(3) Since the first and second T-shaped fittings 43, 44 are used for the bypass passages, the valve is relatively easy to manufacture in comparison to a valve where the manifold 31 has internal bypass passages.

(4) In the present invention, two threaded holes 41a, 42a and two passages 41, 42 are necessary for mounting the first and second fittings 43, 44. However, in the prior art shown in FIG. 6, four threaded holes and four passages are necessary. Accordingly, the manifold 31 can be miniaturized, which reduces the size of the entire valve 17. Further, the space required for accommodating the hydraulic power steering device 7 in the forklift 1 is reduced, and this contributes to reducing the size of the forklift 1.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

For example, the present embodiment can be modified as follows.

Although, in the present embodiment, the bypass passages are formed by the T-shaped fittings 43, 44 mounted to the manifold 31, the bypass passages can be formed in the manifold 31 such that the bypass passages have inside diameters large enough to avoid pressure loss (for example, inside diameters as large as those of the pipes 18, 19). In this case, as in the prior art electromagnetic valve structure, four straight type fittings can be used. In this embodiment, although the manifold 31 must be somewhat enlarged, the effects of the original embodiment are achieved.

The electromagnetic valve is not limited to correcting the knob position in the power steering device 7. It can be used for returning some of the hydraulic oil (the feed oil) driving the hydraulic actuator. Particularly, although the oil supplying device delivers an amount of hydraulic oil corresponding to the operational amount of the steering wheel so that the hydraulic actuator will respond effectively, the oil supplying device is not limited to delivering an amount of hydraulic oil corresponding to the operational amount of the steering wheel. For example, the electromagnetic valve of present invention can be applied to an apparatus in which, when a sensor detects a predetermined value, the oil supplying device sends the hydraulic oil to the hydraulic actuator.

Figure 6:
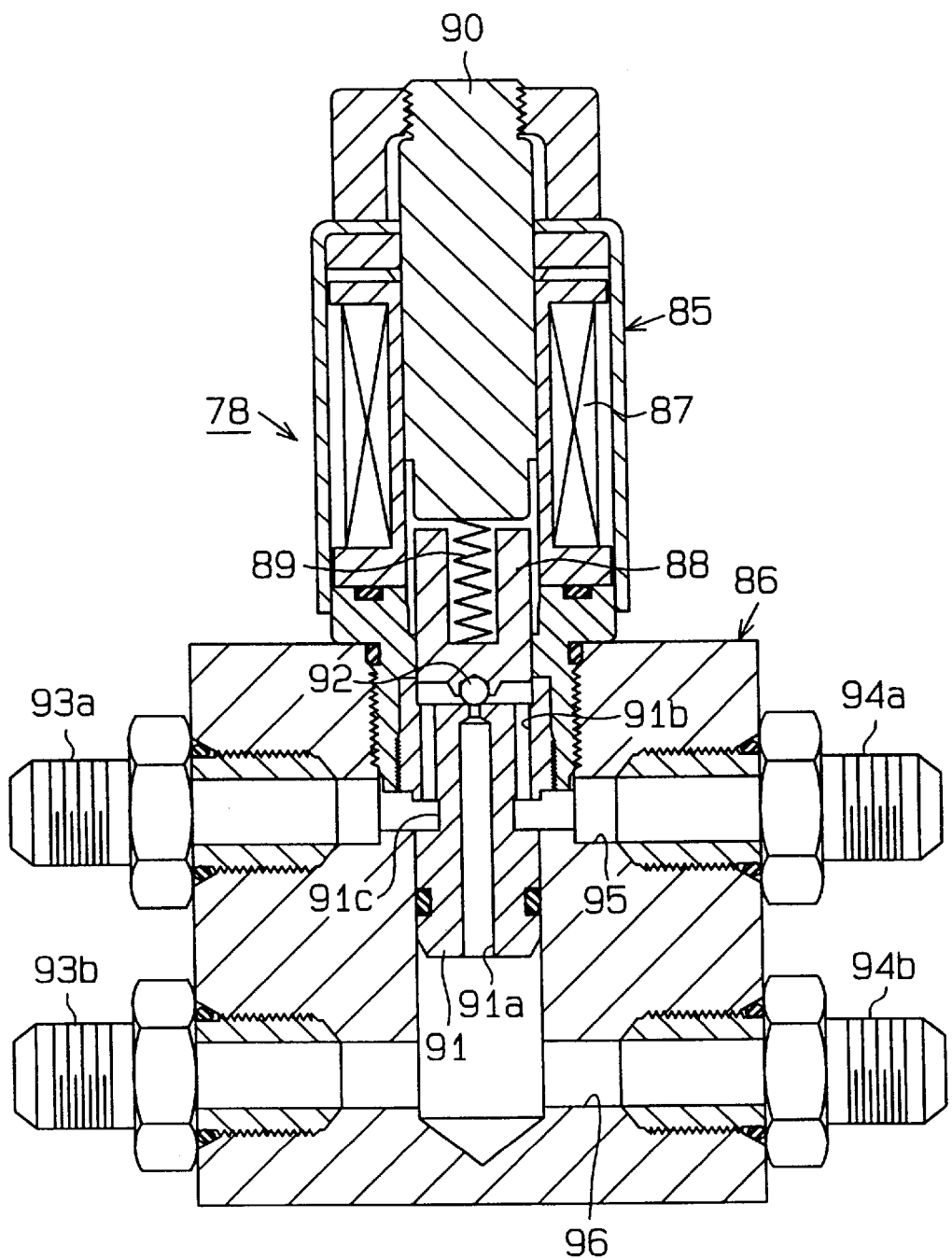
FIG. 6 is a front cross-sectional view of an electromagnetic valve in the prior art.

Using the prior art electromagnetic valve shown in FIG. 6, which has four threaded holes for the straight-type fittings, the electromagnetic valve of the present invention can be constructed. In that case, two of the four threaded holes on the left or right side of FIG. 6 are closed. T-shaped fittings are threaded to the two remaining holes instead of the straight-type fittings.

The fittings are not limited to T-shaped fittings. Any fittings will do, as long as they are three-way type fittings, such as Y-shaped fittings. Further, four-way or more type fittings, such as cross-shaped fittings, can be used if unused ports are closed.

The hydraulic actuator is not limited to a hydraulic cylinder. For example, a hydraulic motor can be used as the hydraulic actuator.

The present invention can obtain particularly remarkable effects when applied to a vehicle such as a forklift, which is heavy and necessitates high oil pressure when steering the steered wheels. However, the vehicle is not limited to forklifts. The present invention can be widely applied to industrial vehicles, other than forklifts, equipped with power steering, and further, to vehicles such as automobiles.

What is claimed is:

1. An electromagnetic valve used in a vehicle having an oil supplying device for supplying hydraulic oil, a hydraulic actuator driven by the hydraulic oil supplied from the oil supplying device, and two pipes connecting the oil supplying device and the hydraulic actuator, the two pipes being such that, when one of the pipes supplies hydraulic oil from the oil supplying device to the hydraulic actuator, the other returns hydraulic oil from the hydraulic actuator to the oil supplying device and vice versa, the electromagnetic valve comprising:

a body;

two passages located at intermediate portions of the two pipes, respectively;

an oil path passing through the body for connecting the two passages to return the hydraulic oil from the one pipe to the other; and a valve mechanism provided within the body, the valve mechanism including a portion of the oil path and a valve body for opening and closing the oil path, wherein each of the two passages includes a bypass passage that does not pass through the valve mechanism.

2. An electromagnetic valve as recited in claim 1, wherein the bypass passage has an inside diameter larger than that of the portion of the oil path included in the valve mechanism.

3. An electromagnetic valve as recited in claim 1, wherein the bypass passage is formed by a three-way fitting or a four-way or more fitting mounted to the body.

4. An electromagnetic valve as recited in claim 3, wherein the fitting comprises a T-shaped fitting.

5. An electromagnetic valve as recited in claim 1, wherein the bypass passage is formed in the body.

6. An electromagnetic valve as recited in claim 1, wherein the minimum diameter of the oil path is so small that it functions as a throttle valve.

7. An electromagnetic valve as recited in claim 1, wherein the body houses a driving control unit for driving the valve body to open and close the oil path.

8. An electromagnetic valve as recited in claim 1, wherein the vehicle comprises a steering wheel, a power steering device operated by the steering wheel through oil pressure, and steered wheels steered by the power steering device, wherein the power steering device comprises a steering valve driven by manipulating the steering wheel, a steering actuator for steering the steered wheels, and the electromagnetic valve, wherein the oil supplying device is the steering valve and the hydraulic actuator is the steering actuator, and wherein the electromagnetic valve is a correcting valve connecting the two pipes connecting the steering valve and the steering actuator to correct the relationship in position between the steering wheel and the steered wheels.

9. An electromagnetic valve as recited in claim 8, wherein the power steering device comprises a control device that detects a difference in position between the steering wheel and the steered wheels, the control device causing the electromagnetic valve to open the oil path when the control device detects the difference in position between the steering wheel and the steered wheels.

10. An electromagnetic valve as recited in claim 9, wherein the control device includes a first sensor for detecting the angular position of the steering wheel, a second sensor for detecting the steered angle of the steered wheels, and a controller electrically connected to the first sensor and the second sensor, the controller determining a target angle of the steered wheels based on the value detected by the first sensor and further determining the difference between the target angle and the actual angle of the steered wheels, as determined by the value detected by the second sensor, the controller successively determining whether or not the difference exceeds a tolerance limit.

11. A power steering device used in a vehicle having a steering wheel and steered wheels, comprising:
- a steering valve for supplying hydraulic oil by the manipulation of the steering wheel;
- a steering actuator for steering the steered wheels by the hydraulic oil supplied from the steering valve;
- two pipes connecting the steering valve and the steering actuator, the two pipes being such that, when one of the pipes supplies hydraulic oil from the steering valve to the steering actuator, the other returns the hydraulic oil from the steering actuator to the steering valve, and vice versa; and
- an electromagnetic valve, which is located in the two pipes, for returning hydraulic oil from the one pipe to the other pipe to correct the positional relationship between the steering wheel and the steered wheels, the electromagnetic valve comprising:
- a body;
- two passages located at intermediate portions of the two pipes, respectively;
- an oil path passing through the body for connecting the two passages to return the hydraulic oil; and
- a valve mechanism provided within the body, the valve mechanism including at least portion of the oil path and a valve body for opening and closing the oil path,
- wherein each of the two passages includes a bypass passage that does not pass through the valve mechanism.

12. A power steering device as recited in claim 11, wherein the bypass passage has an inside diameter larger than that of the portion of the oil path included in the valve mechanism.

13. A power steering device as recited in claim 11, wherein the bypass passage is formed by a three-way fitting or a four-way or more fitting mounted to the body.

14. A power steering device as recited in claim 13, wherein the fitting comprises a T-shaped fitting.

15. A power steering device as recited in claim 11, wherein the bypass passage is formed in the body.

16. A power steering device as recited in claim 11, wherein the minimum diameter of the oil path is so small that it functions as a throttle valve.

17. A power steering device as recited in claim 11, wherein the body houses a driving control unit for driving the valve body to open and close the oil path.

18. A power steering device as recited in claim 11, further comprising a control device that detects a difference in position between the steering wheel and the steered wheels, the control device causing the electromagnetic valve to open the oil path when the control device detects the difference in position between the steering wheel and the steered wheels.

19. A power steering device as recited in claim 18, wherein the control device includes a first sensor for detecting the angular position of the steering wheel, a second sensor for detecting the steered angle of the steered wheels, and a controller electrically connected to the first sensor and the second sensor, the controller determining a target angle of the steered wheels based on the value detected by the first sensor and further determining the difference between the target angle and the actual angle of the steered wheels, as determined by the value detected by the second sensor, the controller successively determining whether or not the difference exceeds a tolerance limit.

* * * * *

UNITED STATES PATENT AND TRADEMARK OFFICE
CERTIFICATE OF CORRECTION

PATENT NO.   : 6,193,009 B1
DATED        : February 27, 2001
INVENTOR(S)  : Kenji Chino et al.

Page 1 of 1

It is certified that error appears in the above-identified patent and that said Letters Patent is hereby corrected as shown below:

<u>Title page,</u>
FOREIGN PATENT DOCUMENTS, please change: "62-261164" to -- 61-261164 --;

<u>Column 6,</u>
Line 2, is after "spool" insert -- 39 --;

<u>Column 7,</u>
Line 69, please change "there is no a significant" to -- there is not a significant --;

Signed and Sealed this

Nineteenth Day of March, 2002

Attest:

JAMES E. ROGAN
*Director of the United States Patent and Trademark Office*

*Attesting Officer*